United States Patent
Bosje

[11] 3,809,242
[45] May 7, 1974

[54] PURIFYING PLANT FOR SEWAGE
[76] Inventor: Jan Bosje, De Goorn 30, Oosterwolde, Netherlands
[22] Filed: July 25, 1972
[21] Appl. No.: 274,961

[30] Foreign Application Priority Data
Aug. 20, 1971 Netherlands.................... 7111546

[52] U.S. Cl................. 210/195, 210/197, 210/202, 210/219
[51] Int. Cl............................................. C02c 1/10
[58] Field of Search........................... 210/2–5, 14, 210/15, 150, 151, 194, 195, 197, 199–202, 256, 260, 219

[56] References Cited
UNITED STATES PATENTS
2,027,370  1/1936  Currie........................... 210/201 X
3,312,346  4/1967  Walker.......................... 210/202 X
3,448,861  6/1969  Berk................................. 210/14 X FOREIGN PATENTS OR APPLICATIONS
970,470  9/1964  Great Britain..................... 210/14

Primary Examiner—John Adee
Assistant Examiner—Robert H. Spitzer
Attorney, Agent, or Firm—Karl W. Flocks

[57] ABSTRACT

A purifying plant for sewage according to the active sludge method comprising an open tank provided with a partition and having the shape of a closed aerating circuit with a supply conduit, a discharge conduit and at least one surface aerator, said aerating circuit having a curved shape such that it substantially encloses a space in which at least one after-settling tank and at least one thickening pond are provided.

3 Claims, 2 Drawing Figures

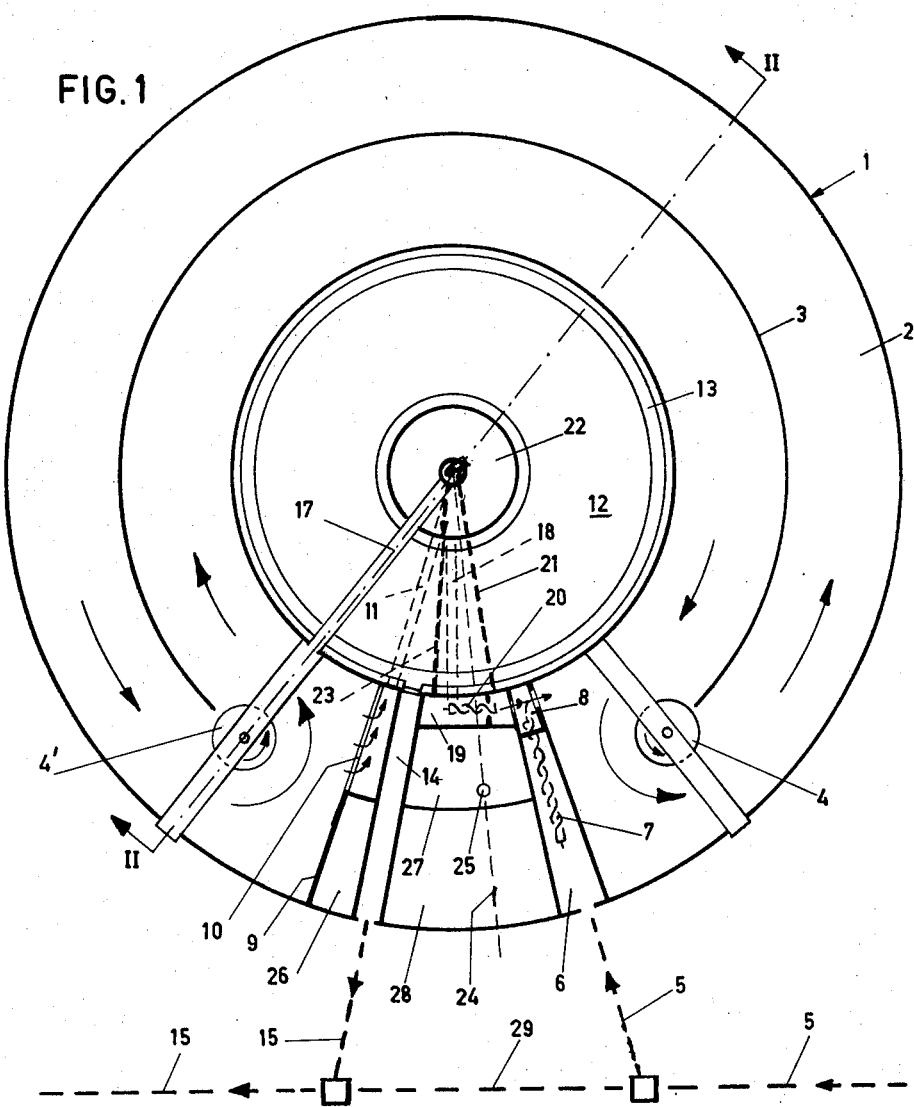
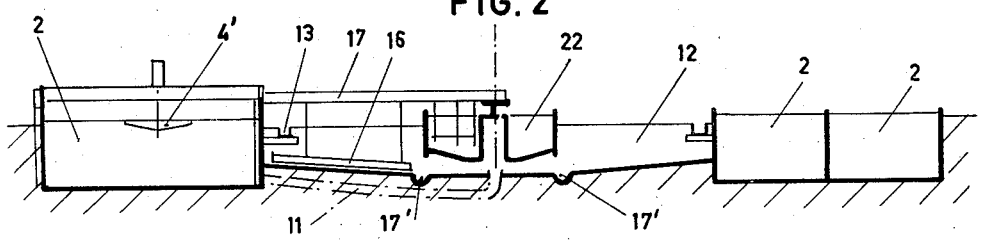

PURIFYING PLANT FOR SEWAGE

This invention relates to a plant for purifying sewage suitable for use according to the active sludge process. It is known to purify sewage or the like by directing fresh incoming sewage from a sewer via grit chambers or the like into an endless channel. The sewage is aerated and activated in the channel and at least a portion thereof, after being retained in the channel for a period, is recirculated for treatment of the fresh incoming sewage.

The invention aims at providing a compact plant of this kind which requires little space, is easy to operate and is suitable for production in batches.

This is accomplished with the plant according to the invention in that it includes an open topped tank having an elongated aerating space so shaped that its end walls are located adjacent each other, said aerating space being provided with a partition wall each end of which is spaced from the adjacent end wall of the said aerating space forming an inner channel portion enclosed within an outer channel portion which are in series with one another so that an endless aerating channel is obtained, there being provided means to charge sewage into the said channel, means to withdraw aerated sewage from the said channel and at least one surface aerator for aerating the contents of the aerating channel, said aerating channel substantially enclosing a space in which at least one settling tank for settling out sludge from the sewage of the channel and at least one sludge tank for the sludge, there being provided means for charging the sewage into the or each sludge-settling tank and means for charging the sludge into the or each sludge thickening tank. Consequently the various components of the plants interconnected by conduits are arranged closely together so that these conduits are short.

It is preferred that an apparatus for operating the plant and a control chamber are accommodated in the space between the end walls of the aerating space.

A preferred embodiment of the plant according to the invention is characterized in that the aerating channel, the space between the end walls of said aerating channel, the sludge-settling tank and the sludge thickening tank are concentrically arranged.

The invention teaches that for purifying plants having a large capacity in the space substantially enclosed by the aerating channel there may be provided at least two sludge-settling tanks each having a concentrically arranged sludge thickening tank. In the space substantially enclosed by the aerating space sludge drying beds can be provided.

The invention will be further explained below with reference to the drawings showing diagrammatically and by way of example an embodiment of the plant for purifying sewage according to the invention.

The drawings show in:

FIG. 1 a top plan view of said plant and in

FIG. 2 a section of the plant shown in FIG. 1 according to the line II—II.

The plant for purifying sewage shown in the drawings comprises an open topped tank 1 in which there is provided an aerating space 2 having end walls 9 which are spaced from, but adjacent to each other. Said aerating space being provided with a partition wall 3, each end of which being spaced from the adjacent end wall of said aerating space, so that an inner channel portion is formed which is enclosed by an outer channel portion, said channel portion being in series with one another, so that an endless aerating channel is formed in which the sewage may circulate. Near both ends of said partition wall an aerator 4, 4' is mounted by which the sewage in said endless aerating channel is kept moving. The sewage is admitted at one end of the aerating space 2. For this purpose the plant is provided with a conduit 5 supplying the sewage to a sector-shaped feed pit 6 adjacent the respective front wall of the tank 1. In this feed pit 6 there is provided a worm screw conveyor 7 supplying the sewage from the feed pit 6 to a pit 8 provided in a direct line with the feed pit, said pit 8 communicating via an opening in one of the end walls 9 with the aerating space 2. The sewage entering of the aerating space 2 is thoroughly mixed by the aerator 4 with the sewage already present in said space 2. Instead of a worm screw conveyor 7 one may also use a pump.

In the other of the end walls 9 of the aerating space 2 there is provided a weir 10 which preferably is adjustable in height and across which an equally large quantity of water and sludge mixture flows as is fed by the pit 8 to said aerating space 2. This amount of water and sludge is supplied by a conduit 11 to a sludge-settling tank 12 in which the sludge settles out. The purified water, free of sludge, flows across the edge of a discharge gutter 13 via an annular sector-shaped measuring compartment 14 to a conduit 15 through which the purified water is discharged.

The sludge settled out in the sludge-settling tank 12, which has an important function in the purifying process, since it carries the decomposition bacteria, is moved on the bottom of the sludge-settling tank 12 by means of a sludge clearing device 16 secured to a rotating bridge 17, to a circular sludge gutter 17' in which it is conveyed by a scraper device to a conduit 18 which is in communication with a pit 19. In said pit 19 a sludge returning worm screw conveyor 20 is provided which supplies the sludge to the pit 8 where it is mixed with the supplied sewage and flows back into the aerating space.

If there is too much sludge in the sludge-settling tank 12 the excess sludge is supplied via a conduit 21, shown in dotted lines, to a sludge thickening tank 22. For this purpose said conduit 21 is connected to the high side of the sludge returning worm screw conveyor 20. For the purpose of discharging the sludge there is provided at weir level of the sludge thickening tank 22 a conduit 23, shown in broken line, which ends at the low side of the sludge returning worm screw conveyor 20 in the pit 19.

When the sludge in said sludge thickening tank has sufficiently been thickened the supply of sludge to said sludge thickening tank can be stopped and the thickened sludge can be conveyed via a conduit 24 and a pump 25 to sludge drying beds (not shown) after these have been set dry.

The drainage under the entire plant is concentrated in a drainage pit 26 situated in line with the weir 10. Thus the water under the plant can be drained off by pumping and consequently buoyancy of the plant is prevented.

Between the feed pit 6 and the pit 8 on the one hand and the measuring compartment 14 on the other hand there are a chamber 27 containing the apparatus for operating the plant and a space 28 which may serve as a laboratory, workshop or similar purpose.

In order to make it possible to render the plant temporarily inoperative there are provided in the supply conduit 5 and in the discharge conduit 15 valves interconnected by means of a bypass 29.

It is obvious that the invention is not restricted to the embodiment described above by way of example, but that it can be modified in many ways without departing from the scope of the invention. Instead of two surface aerators which preferably are of the type of which the rotor rotates about a vertical shaft, one may for example also use one single surface aerator. A plant of larger capacity may be realized by providing within the space substantially enclosed by the aerating space two sludge-settling tanks each with a sludge thickening tank concentrically arranged thereto. The endless aerating space is then constituted by two semicircular channel sections connected by straight channel sections, so that it has substantially the shape of an oval. The space enclosed by the aerating channel and lying between the sludge-settling tanks may then be used, if desired, for the provision of sludge drying beds.

I claim:

1. A plant for purifying sewage suitable for use according to the activating sludge process including an open topped curved tank having an elongated aerating space so shaped that its end walls are located adjacent each other, said aerating space being divided by a partition wall each end of which is spaced from the adjacent end wall of the said aerating space forming an inner channel portion enclosed within an outer channel portion which are in series with one another so that an endless aerating channel is obtained, there being provided means to charge sewage into the said aerating channel, means to withdraw aerated sewage from the said aerating channel and at least one surface aerator for aerating the contents of the aerating channel, the inner channel portion substantially enclosing a space in which there is at least one settling chamber for settling out sludge from the sewage aerated in said aerating space and at least one sludge thickening chamber for the sludge, said sludge thickening chamber being concentrically arranged in said sludge settling chamber, there being provided for charging the aerated sewage into said at least one sludge-settling chamber, means for charging the sludge into said at least one sludge thickening chamber, means for returning settled sludge from the settling chamber to the aerating space and means for discharging the purified water out of the sludge settling chamber, the end walls of the aerating space lying at a distance from one another so that therebetween a space is formed in which an apparatus for operating the plant and a control chamber are accommodated.

2. A purifying plant for sewage according to the active sludge method according to claim 1, characterized in that in the space substantially enclosed by the aerating channel there are provided at least two sludge-settling chambers lying at a distance from one another, each of said sludge-settling chambers being provided with a sludge thickening chamber concentrically arranged therein.

3. A purifying plant for sewage according to the active sludge method according to claim 1, characterized in that in the space substantially enclosed by the aerating channel there are provided at least two sludge-settling chambers lying at a distance from one another, each of said sludge-settling chambers being provided with a sludge thickening chamber concentrically arranged therein, sludge beds being provided between said sludge-settling chambers.

* * * * *